United States Patent
Chopp, II

(10) Patent No.: US 12,488,083 B2
(45) Date of Patent: Dec. 2, 2025

(54) FINE-GRAINED ELEVATION AND RESTRICTION OF API FUNCTION CALLS

(71) Applicant: DELINEA INC., Redwood City, CA (US)

(72) Inventor: Charles A. Chopp, II, Greer, SC (US)

(73) Assignee: DELINEA INC., Redwood City, CA (US)

( * ) Notice: Subject to any disclaimer, the term of this patent is extended or adjusted under 35 U.S.C. 154(b) by 195 days.

(21) Appl. No.: 18/227,109

(22) Filed: Jul. 27, 2023

(65) Prior Publication Data
US 2025/0036743 A1    Jan. 30, 2025

(51) Int. Cl.
G06F 21/00    (2013.01)
G06F 21/44    (2013.01)

(52) U.S. Cl.
CPC .................................. G06F 21/44 (2013.01)

(58) Field of Classification Search
CPC ...................................................... G06F 21/44
See application file for complete search history.

(56) References Cited

U.S. PATENT DOCUMENTS

| | | |
|---|---|---|
| 2011/0030045 A1 | 2/2011 | Beauregard et al. |
| 2013/0276098 A1 | 10/2013 | Austin et al. |
| 2019/0243985 A1 | 8/2019 | Goodridge et al. |
| 2022/0277092 A1* | 9/2022 | Goodridge ............ G06F 21/629 |
| 2024/0403413 A1* | 12/2024 | Cohen ..................... G06F 21/53 |

OTHER PUBLICATIONS

European Search Report and Search Opinion received for European Application No. 24190715.3, mailed on Dec. 23, 2024, 13 pages.

* cited by examiner

Primary Examiner — Rodman Alexander Mahmoudi
(74) Attorney, Agent, or Firm — WOMBLE BOND DICKINSON (US) LLP

(57) ABSTRACT

A method for implementing a privilege management agent in an operating system having User Account Control (UAC), the privilege management agent having pre-defined application control policies and an application control service (ACS). The privilege management agent is used to process elevation requests to provide an access token to allow a process running under a user account to run as an elevated process based on the pre-defined process access policies. The method includes intercepting an elevation request from a process having a primary access token provided by the UAC after a user launches a process that requires elevation, tagging the process for possible elevation. The ACS evaluates the tagged process and pre-defined process access policies for a match which corresponds to the elevation request. If found, the ACS applies a customized access token to elevate the process to run with elevated rights, otherwise the process is terminated.

10 Claims, 10 Drawing Sheets

FINE-GRAINED ELEVATION AND RESTRICTION OF API FUNCTION CALLS

FIELD OF THE INVENTION

The invention relates to a privilege elevation model known as any of "User Account Control" (UAC), "Least User Access" (LUA), "Mandatory Integrity Control" (MIC), and other obscure names, that have been present in Microsoft® Windows, starting with Windows Vista, which is very "coarse" in the way it handles elevation requests. The invention is directed to a new elevation methodology which allows for fine-grained control of elevation as specific Win32 API, (e.g., the Microsoft® Windows Application Programming Interface) functions are called by an application. Based on how the software that implements the invention is configured, all calls that an application makes to a configurable set of Win32 API functions are subject to being inspected via evaluation input parameter values, and then the invention selectively alters how the function call is completed or blocked along with selectively altering the privilege level of the thread making the function call. The invention targets both 64-bit and 32-bit program code executing on all versions of Microsoft® Windows operating systems. The use of "Win32" in the term Win32 API is a legacy artifact dating back to when the transition from Windows 95 to Windows NT occurred. As such, the appearance of "32" in Win32 has relevance or meaning.

BACKGROUND OF THE INVENTION

An "Application Control Service" (ACS) is a component of an existing "Privilege Manager Agent for Windows" available from Delinea Inc., which runs as a native Windows NT service. It has a companion device driver, and several related program files and programming libraries that implement various aspects of the functionality of ACS.

The existing ACS works by using a set of rules or policies to determine what actions an application is allowed to perform. These rules can be defined by the system administrator, sometimes referred to as an admin user or the developer of the application itself. A regular user, that is a non-admin user, is sometimes referred to as a normal user, restricted user, or just a user. When an application process attempts to call any function that is under control of ACS, the operation is evaluated, compared with configured application control policies, and then a determination is made regarding whether to block the operation, allow the operation "as-is", modify the function call parameters and/or alter the privilege level (elevation) of the thread for the duration of the function call.

ACS can be particularly useful in enterprise environments where security is a top concern. By using ACS, system administrators can ensure that only authorized actions are performed on their systems, reducing the risk of data breaches or other security incidents.

The following is an overview of how privilege management mechanisms work in Microsoft® Windows.

1. Application Control: Application control refers to the mechanisms used to manage and control the behavior of applications running on a system. It involves setting permissions, access controls, and restrictions to ensure that applications adhere to desired security policies and guidelines.
   In the Microsoft® Windows environment, built-in support for application control is implemented through various methods, including:

User Account Control (UAC): UAC helps prevent unauthorized changes to the system by forcing all interactive logon sessions to run as a normal user. When an administrative user account logs on, excess levels of privilege beyond a normal user are stripped from the user's primary access token to create a "filtered" token but leaves the full set of administrative privileges present in a "linked" token which UAC can utilize. UAC prompts the user to either provide administrator credentials or consent before allowing the action to proceed.

Group Policies: Group Policies are a powerful and complex set of configuration settings that allow administrators to control various aspects of the Windows environment, including application behavior. Group Policies can be used to restrict access to certain applications, define application-specific settings, enforce security policies, and more.

Application Whitelisting/Blacklisting: Administrators can implement application control by specifying lists of allowed (whitelisted) or blocked (blacklisted) applications. This approach restricts users from running unauthorized or potentially harmful applications on the system.

AppLocker: AppLocker is a feature in Windows® that allows administrators to define and enforce application control policies based on file attributes such as publisher, path, file hash, or digital signature. It enables fine-grained control over which applications can run on a system.

The primary functionality of UAC is implemented in the "Application Information" (AppInfo) service, which handles all requests to run an application with elevated privileges. Here is a high-level explanation of how UAC performs elevation of an application process.

In the Microsoft® Windows environment, the AppInfo service is responsible for creating processes with elevated privileges when the parent process itself lacks elevated privileges. This is the elevation workflow that participates in:

1. User Action: When a user attempts to execute an application that requires administrator privileges, either by launching it directly or by performing an action that triggers the UAC prompt (such as modifying system settings), UAC comes into play.

2. UAC Prompt: When UAC detects that an application requires administrator rights, it displays a prompt on a secure desktop that is not accessible by any other processes running in the user's interactive desktop session. This prompt requests the user to either provide administrator credentials (normal user) or to give administrative approval (admin user with "filtered" token) to proceed with the privileged action.

3. There are multiple ways for a process to be created on Microsoft® Windows. As it relates to UAC and the AppInfo service, they perform the following operations when one process (the parent) attempts to create another process (the child):

a. Application Manifest Analysis: The application's manifest is an XML file embedded within the application's program file or as a separate file co-located together within the file system. If present, the manifest is analyzed. The manifest contains information about the application's requested execution level, which specifies the required privileges. If the application's manifest indicates that administrator privileges are mandatory or the user specifically requested that the application be run with administrator privileges, a request is sent to the AppInfo service, and the UAC prompt is triggered.

b. Compatibility Detection: The Appinfo service also checks for compatibility issues that may affect the application's behavior when running with UAC enabled. This includes checking for compatibility shims, which are small pieces of code that provide compatibility fixes for applications that were not initially designed to work with UAC.

c. Policy Enforcement: The Appinfo service enforces UAC policies defined in the system's security settings. These policies determine the behavior of the UAC elevation prompt. Normal users are always prompted for administrative account credentials. For admin users with a "filtered" token, the system can be configured to present the UAC prompt asking for consent in "Admin Approval Mode" or just silently allow the elevation to occur. The service ensures that the correct policies are applied and that the prompt is displayed according to the system's configuration. Additionally, there is a specific subset of system management programs that are always run with elevation by being present in an internal "whitelist" if an admin user attempts to run any of them.

4. User Response: Based on the Appinfo service's analysis and the configured UAC policy, the UAC elevation prompt is displayed to the user. If the user has administrator rights and grants consent or provides valid credentials, the application is launched with the necessary elevated privileges. Otherwise, if the user lacks administrator rights, the UAC elevation prompt will indicate that administrator credentials are required to proceed.

In summary, the "Application Information" service (Appinfo) analyzes the application's manifest, checks for compatibility, and enforces UAC policies to determine if the user has administrator rights. This information is then used to trigger the UAC prompt and ask the user for consent or credentials accordingly.

The Microsoft® Windows elevation model requires user processes, typically in an interactive desktop session, to run with either a restricted primary access token or with a "split" token where the primary token is restricted but contains a "linked" impersonation token with full administrator rights. For non-administrator users, attempting to run a program with administrator rights requires responding to an elevation prompt requesting administrator credentials. For administrator users, the same action requires responding to a consent prompt requesting approval of the usage of the "linked" token with full administrator rights.

In general, access tokens contain the following key items of information, some being single values and others being collections of values:
Account SID that identifies the user.
A collection of group SIDs.
A collection of LSA privileges.
A collection of Token Security Attributes
A collection of user-specific Kerberos claims.
A collection of device-specific Kerberos claims that belongs to the computer on which the access token was created.

When a process attempts to access any securable object, the content of the access token is compared with the content of the security descriptor as part of performing an "effective access" check. The result of the effective access check determines if the attempted access is allowed or denied.

Certain items in the access token allow for the security descriptor to be bypassed or are used by Windows® to allow/deny certain administrative operations in Windows® that are not otherwise secured by a security descriptor. For example, having the "backup" and "restore" Local Security Authority (LSA) privileges allow bypassing access checks in the file system so that the admin user automatically has full unrestricted rights to any directory or file on a volume. Another example is having the SID of the "BUILTIN\Administrators" group present in the access token, which is required for certain functions to be usable regardless of the LSA privileges that are present in the access token.

In all cases, if elevation occurs, the process is created with a primary access token containing full administrator rights which may present a broader attack surface than is necessary or desirable. If the program being executed by the process were to be compromised by malware or can otherwise be used to perform static assignment of privilege to user accounts or local groups, it can lead to an escalation of privilege attack.

The terms "Access Token", or just "Token" for short, apply to all versions of the Windows® NT platform family. For purposes of the discussion of UAC and the AppInfo service, access tokens are relevant to the Windows® NT platform family starting with Windows® Vista and on through the latest Windows® 11 builds along with the equivalent/corresponding server editions Windows® Server 2008 through Windows® Server 2022.

Another important term that is referenced is "Security Descriptor", or "SD" for short. All "objects" in Windows®, such as directories and files in a NTFS or Resilient (ReFS) file system, keys and values in the registry, communication endpoints like "named pipes," processes, threads, native NT services, access tokens and other types of "kernel objects" all have a security descriptor applied to them which determines what the persistent security settings are for the object. A security descriptor defines an "Owner", a "Group owner", a "Discretionary ACL" (a.k.a. "DACL", commonly called the "permissions") and a "System ACL" (a.k.a. "SACL"), which holds audit settings, the integrity level SID and other security settings, where ACL is a Win32 Access Control List.

The term "Security Identifier", or "SID", embodies the definition of an "identity" for a user, group, computer, or any other type of object which can perform a logon on a Windows system. Both access tokens and security descriptors contain SID values.

Lastly, the term "LSA Privilege" represents a type of administrative rights capability that exists outside of the security settings that are present in a security descriptor.

FIGS. 1-4 are prior art flow diagrams that provide a basic explanation of how Microsoft®'s UAC functions without the invention's fine-grained control of Win32 API function calls. UAC implements a concept sometimes referred to as LUA (Least User Access).

FIG. 1 illustrates the usual flow when a regular user performs a logon for a regular user session under Windows® UAC. Typically, to begin a session, the user presses the CTRL-ALT-DEL keys which brings up a logon screen for the user to enter 11 the username and password logon credentials. Assuming the proper credentials were entered, an access token is created 13 with restricted rights. Then, the Windows Explorer UI (explorer.exe) is launched 15 with the access token. This becomes the parent/root process for all processes that get created during that logon session.

FIG. 2 illustrates the usual flow when an admin user performs a logon of an administrator user session under Windows® UAC. Typically, to begin a session, the admin user presses the CTRL-ALT-DEL keys which brings up a logon screen for the user to enter 21 username and password logon credentials. Assuming the proper admin user credentials were entered, a split access token is created 23 with restricted rights. Then, the Windows® Explorer UI (explorer.exe) is launched 25 with the split access token. This becomes the parent/root process for all processes that get created during that logon session. In addition, a linked access token is created 27 with full administrator rights and is linked to the primary split access token. In this manner, depending on subsequent processes launched by the admin user, either the linked "admin" access token or the primary "restricted" access token is applied as needed.

FIG. 3 illustrates the usual flow when a regular user tries to launch a program which requires elevation under Windows® UAC. After a regular logon by a user without admin rights (FIG. 1), the user tries to launch 31 a program that always requires elevation or selectively requests to be run elevated. That is, some operations do not require admin rights, but others do. UAC, by way of the AppInfo service, detects 33 that the user does not have admin rights needed to run a process than requires elevation. In this case, UAC switches to a secure desktop and presents the user with a consent prompt 35 to query the user for admin credentials. If the user fails to provide the required admin credentials, then UAC cancels the operation, and the program fails to launch 37a. If the user does provide the required admin credentials, a new access token is created 37b and then UAC launches 39 the program using the created access token and runs in a process with full admin rights.

FIG. 4 illustrates the usual flow when an admin tries to launch a program which requires elevation under Windows® UAC. After a regular logon by a user with admin rights (FIG. 2), the user tries to launch 41 a program that always requires elevation or selectively requests to be run elevated. That is, some operations do not require admin rights, but others do. UAC, by way of the Application Information service, detects 43 that the user has a split token with admin rights needed to run a process than requires elevation. The split token indicates that a linked admin token is present. In this case, UAC switches to the secure desktop and presents the user with a consent prompt 45 to query the user for administrator approval mode. That is, even though the user has a linked admin token, the admin user must still approve the operation. If the admin user at that point decides to cancel, the program fails to launch 47a. If the user does approve the request, the linked access token with full access rights is duplicated 47b and UAC launches 49 the program using the duplicated access token and runs in a process with full admin rights.

As should be apparent, in the prior art, the availability of elevated privileges contained within access tokens is performed at a high level meaning, grant or deny based on admin rights without taking into account polices that allow for a more fine-tuned approach such that some processes can be allowed to run with different levels of administrator privileges. That is, some processes can be run with a lower level of administrator privileges than others depending on the amount of security needed to run a process.

BRIEF SUMMARY OF THE INVENTION

The invention changes the way a prior art Privilege Manager (PrivMan) product available from Delinea, Inc. works in several ways. A PrivMan Agent is an agent that is installed on Windows® and "ACS" (Application Control Service) which is one of the native NT services that is part of the PrivMan Agent for Windows®. The PrivMan Agent for Windows® takes precedence with respect to how default User Account Control (UAC) elevation occurs and asserts itself by inserting a "shim" (dynamic library) into the AppInfo service, thus allowing the PrivMan Agent's ACS logic to take control of all incoming elevation requests received by the AppInfo service. The ACS logic in the "shim" code inserted into the AppInfo service then creates a non-elevated process and "tags" it with information that the ACS service uses to recognize that elevation was requested. If a policy exists which is configured to elevate the process, then the ACS service creates a new access token with the specified administrative rights and uses it to replace the process's primary token. If no policies resulted in the process being elevated, the target process is terminated, and Microsoft®'s default implementation of UAC is invoked as a fallback. For non-administrator users who do not have access to administrator credentials, that effectively ends the attempt at elevation, while administrator users can still get the process to run elevated if they respond to the elevation consent prompt with an affirmative response as explained with reference to FIG. 3 or FIG. 4.

With the methodology defined by the present invention, an improvement over the Microsoft® elevation model is achieved as well as improvement over how PrivMan itself has traditionally performed elevation of a process. It now becomes possible to have the process always run with a restricted primary token while the invention maintains its own elevated token with administrator rights to be used selectively for thread-level impersonation during specific Win32 API function calls. By going a step beyond the traditional removal of static assignment of elevated rights in favor of on-demand elevation of entire processes, it becomes possible to further reduce the attack surface presented by a process. Now, with the process running with a restricted token, any arbitrary code-injection attack that is successful finds itself still limited in the scope of malign activities that it can perform.

The invention is intended to target certain types of Win32 API functions where access to a resource is determined based on the primary process token or thread impersonation token that is in effect at the time that an access check is made. For example, obtaining a "handle" to a directory or file on a NTFS volume involves comparing the effective token against the security descriptor that is present in the file system, with the result of the access check determining what effective access is granted to the handle if the operation is successful. After the handle has been obtained, the effective access associated with the handle is immutable and the effective token for the process/thread becomes irrelevant for all subsequent operations involving the "handle" that was obtained. This is how the Windows® NT security model works for all kernel and executive "objects" which are "securable," e.g., protected by a security descriptor. This same pattern is present when accessing other types of securable objects such as when making Win32 API calls to manage Local Security Authority (LSA) privilege assignments, managing local group memberships, managing user accounts, accessing the registry, accessing the file system, etc. By choosing to selectively elevate a single thread within a process for the duration of a single function call, greater security is achieved, and very fine-grained control is asserted over operations for which control is desired.

Elevating a single Win32 API function call is not the only thing that can be performed. The inverse, where a restricted access token is selectively imposed on the thread during a function call is also possible, as is outright blocking of the function call. Depending on the results of "parameter filtering," defined as inspecting input parameters and altering the flow of program execution based on their values, individual function calls can be allowed/blocked, have their input parameters altered, be performed elevated/restricted, etc.

DETAILED DESCRIPTION OF THE INVENTION

Figure 1:
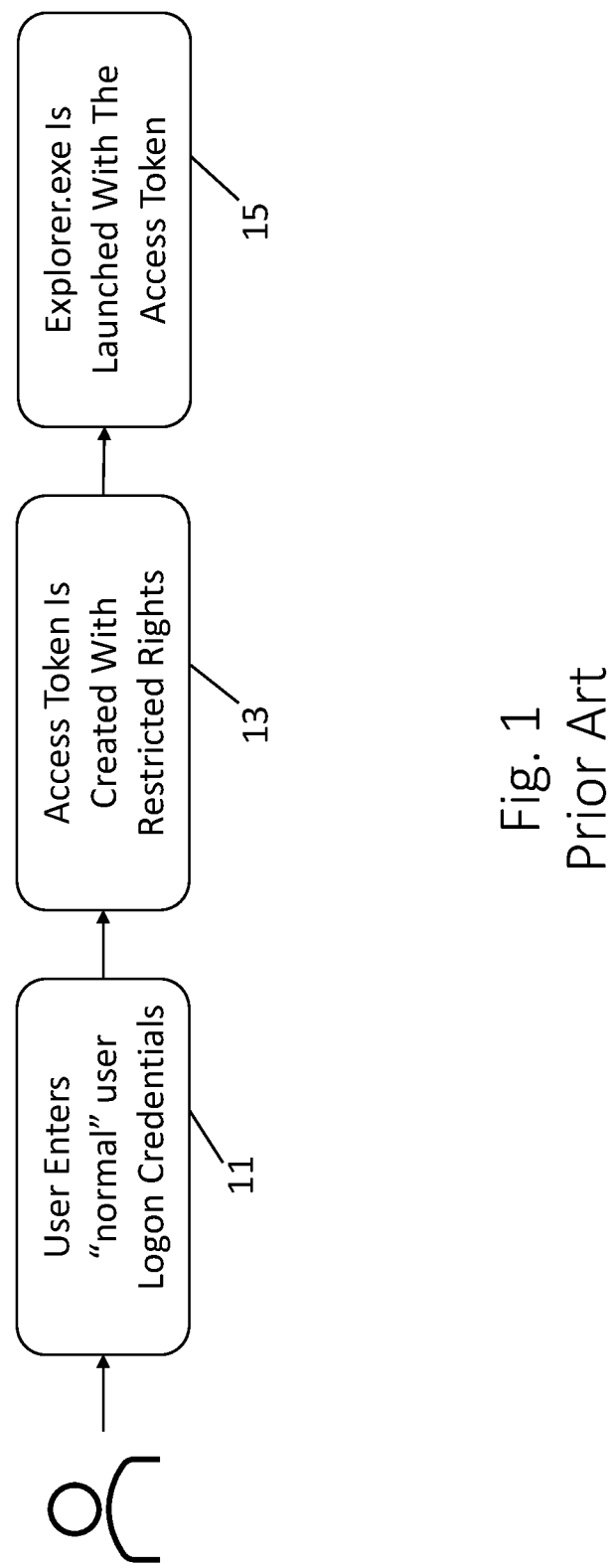
FIG. 1 is a flow diagram showing a logon for a normal user, that is, a user who has no administrator rights, using the Windows® UAC, as in the prior art.

The invention will now be described with reference to FIGS. 5-10. The methodology defined by this invention requires the following:

Injection of a Dynamic-Link Library (DLL) containing code according to the invention into a target process is required to assert control over it.

This is currently done in the prior art, but the DLL in question contains updated program code implementing the new behavior for fine-grained control according to the invention. In and of itself, DLL injection is nothing new and it is a technique commonly used by security enhancement and anti-malware products, and, therefore, no further explanation is necessary.

Creation of a new access token with either full administrator rights or some other more limited form of elevation. For example, a partial subset of administrator rights, but more than a normal non-administrator user, as well as a restricted copy of the process's existing primary token, if it was already running elevated, along with a secure method for the invented code to obtain and retain a handle to those tokens in the injected code for subsequent use. This elevated token and restricted token exist independently of the process's primary token and the optional linked token that may exist for an administrator user. A device driver that monitors for process/thread creation and termination events can take on an expanded role, if necessary, in providing secure mechanisms for communication and hand-off of things like handles to access tokens between an application control service process used by the invention and a target process that is executing the injected code.

Selective hooking of Win32 API functions is performed, and based on the configuration of a policy that matches the target process, along with corresponding wrapper functions that implement the logic to make decisions about elevation/restriction, allow/blocking, parameter filtering, etc., various API function calls made by the target process are subjected to application control logic. It should be noted that the "Microsoft® Detours library, which is open source, is used by the invention to perform API function hooking so that function calls can be selectively restricted or elevated. Detours is not the only way to achieve this, but it is a convenient and effective means of doing so.

Target process is forced to run with a restricted primary token. If a linked token is present with administrator rights, the invention can selectively remove the linked token to deliberately disable Microsoft®'s "split" token behavior as it relates to UAC and elevation.

The invention provides the ability to selectively alter how specific Win32 API functions are executed based on policy settings, including optional criteria applied to the input parameters.

The invention blocks the function call either unconditionally or selectively based on the input parameters, and allows the function call to proceed unmodified, either unconditionally or selectively based on the input parameters. This allows the function call to proceed with changes to the input parameters, while impersonating either an elevated token and or restricted token.

In all cases, if the ACS fully or partially elevates a process, this results in a new customized access token being created by the ACS and then applied to the process by replacing its primary access token. From that point on, all access checks that are performed for operations performed by the process involve the customized access token. Replacement of the primary access token for a process can only be performed during the process creation operation. The ACS coordinates with a device driver running in kernel mode where the device driver "freezes" the process before it begins executing its program and then notifies the ACS of the process creation being in-progress. The ACS then performs policy evaluation and optionally replaces the primary access token of the process before allowing the process to resume and for the process creation operation to be completed. It is also possible for a policy to enforce a "deny" action that prevents an application from being executed, in which case instead of resuming the process, the process is terminated.

If Microsoft®'s UAC performed elevation, again, the process is created with a primary access token that contains admin rights, and then all subsequent operations performed by the process involve the elevated admin token that UAC used to create the process.

Regardless of how elevation was applied or if a process is running as a restricted user, the primary access token for the process applies to all Win32 API function calls that are made by threads in the process unless a specific thread is running with an impersonation token in effect. Once the process creation operation is complete and the process has begun executing its program, the primary access token cannot be replaced.

The invention modifies how UAC handles elevation requests by using what is referred to herein as the PrivMan Agent which allows for new token modification behavior created by the invention.

The new functionality for this invention provides some innovative changes to how the primary access token is managed for a process in that it operates with the following innovations.

- Selectively remove the "linked" admin token from the primary access token that a process was created with and then set this modified token as the process's new primary access token. This prevents any given process from creating a child process that runs elevated by way of the default UAC "Consent" prompt for "Admin Approval Mode" elevation requests.
- The ACS can create an elevated token based on policy settings, using an invented code injection methodology to ensure that the process has "application control" asserted over it and then make the injected code aware of the presence of the elevated token. This "ACS Alternate" token is "hidden" in that it does not reside in any well-known location in the process, nor in any well-known location in the primary access token. The ACS Alternate token exists only for use by the implementing code of the invention.
- The injected application control code "hooks" various Win32 API functions based on policy settings that the ACS injected into the process as one or more "payloads" of application control settings.
- When the process's program or any DLL that it has loaded makes a call to one of the "hooked" Win32 API functions, execution is instead routed through a corresponding "wrapper" function present in the injected code.

The wrapper function refers to the application control settings data from the previously injected "payloads" and selectively does any of the following:
a) Block the function call either unconditionally or selectively based on analysis of the input parameters.
b) Allow the function call to proceed unmodified either unconditionally or selectively based on analysis of the input parameters.
c) Allow the function call to proceed but with one or more input parameters modified to change the way that the underlying function call operates.
d) Allow the function call to proceed while temporarily impersonating the ACS Alternate token that ACS made available to the injected code.
e) Allow the function call to proceed, but, if the primary process token is elevated, generate a temporary restricted access token from the primary token that will be impersonated for the duration of the function call.

If the PrivMan ACS fails to find any matching policies that would result in elevating a target process, then the target process simply runs as-is without having any administrator privileges added to it. In the context of the invention, the scenario where no applicable policies match would mean that the application control logic is inserted into a target process via code-injection would be absent or not populated with any of the "selective elevation" data such as the ACS Alternate token, nor would it have any Win32 API functions hooked and wrapped for any of the possible "unconditionally block", "selectively allow/block" or "selectively elevate/restrict" operations.

Figure 5:
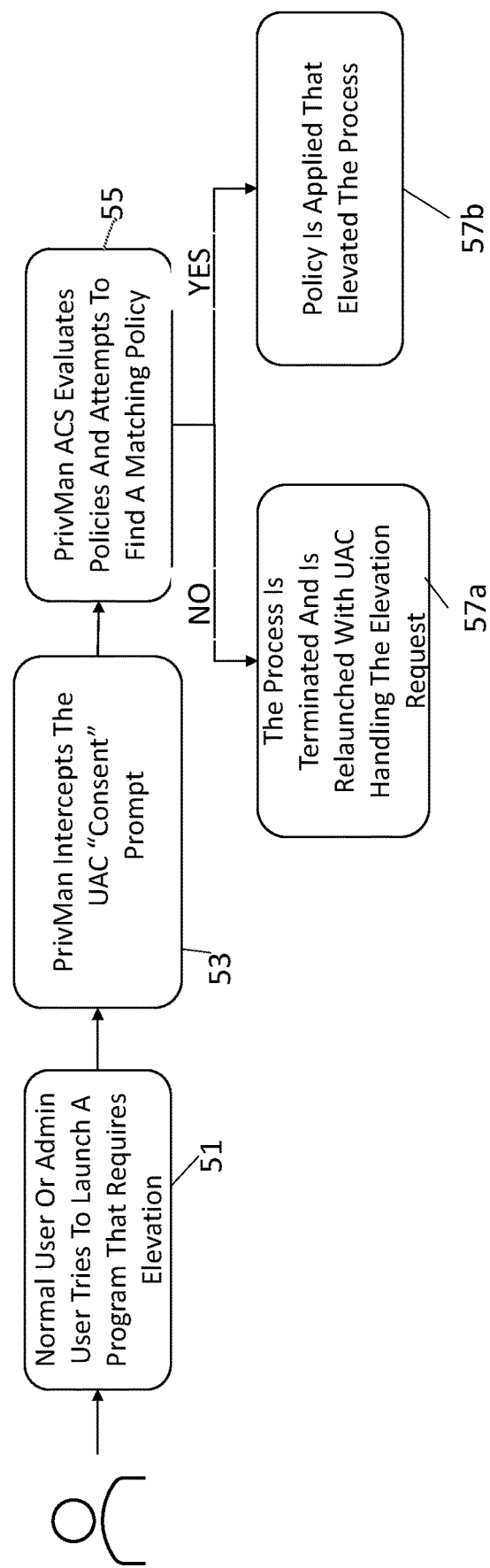
FIG. 5 is a flow diagram showing a normal or admin user running a program with elevation, using Windows® UAC, according to the invention.

FIG. 5 is a flow diagram showing a normal or admin user running a program with elevation, using Windows® UAC, according to the invention.

Figure 2:
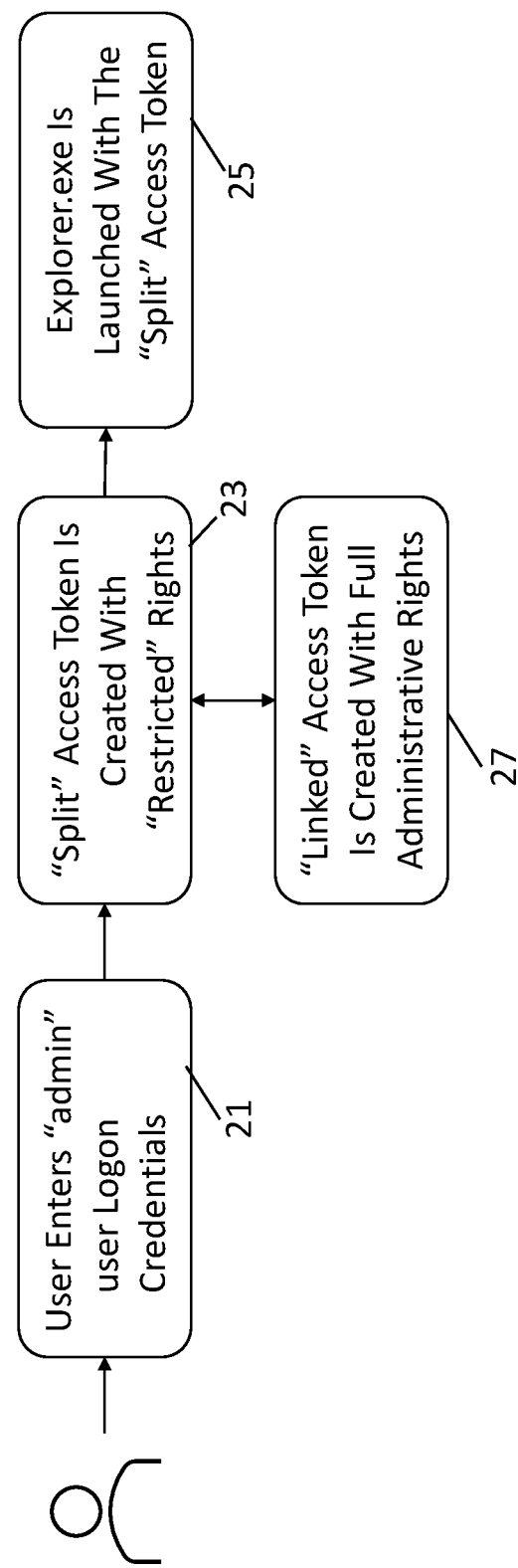
FIG. 2 is a flow diagram showing a logon for an admin user, that is, a user who has full administrator rights, using the Windows® UAC, as in the prior art.
Figure 3:
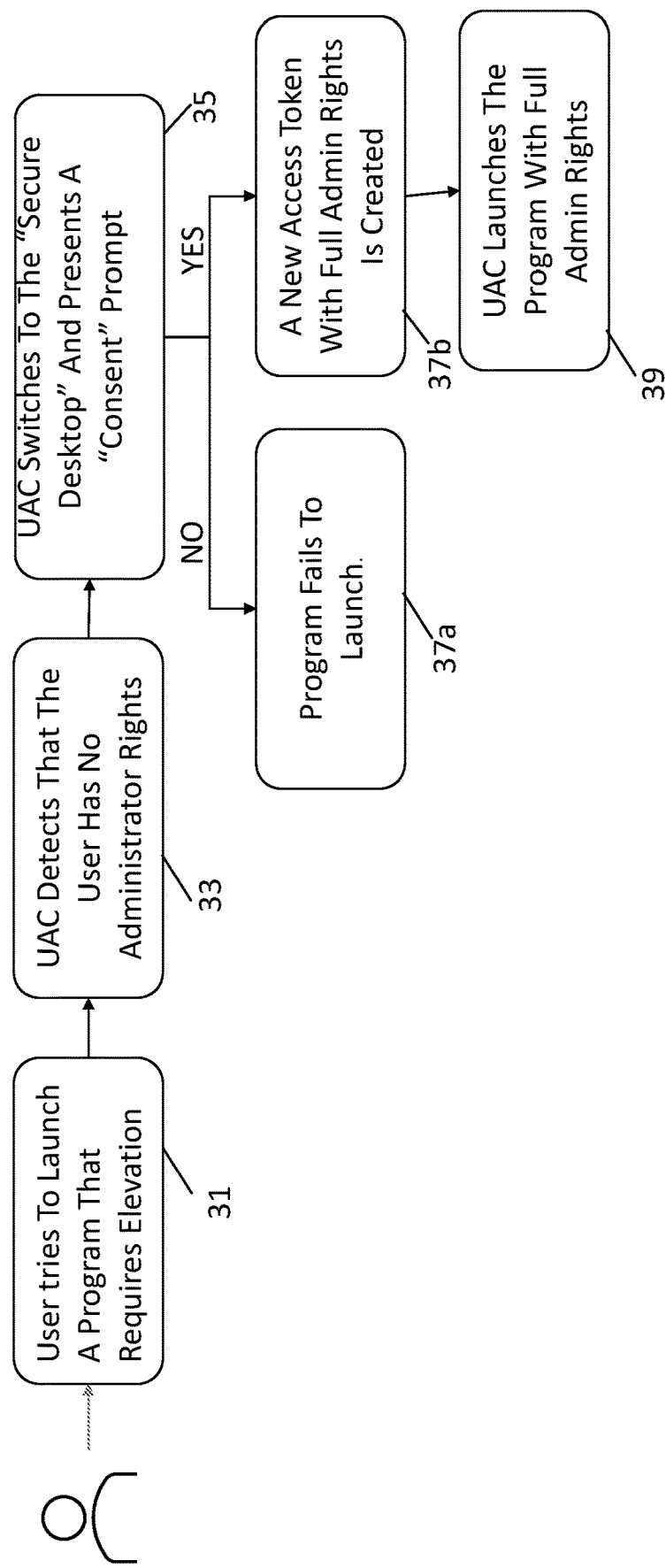
FIG. 3 is a flow diagram showing a normal user running a program with elevation, using the Windows® UAC, as in the prior art.
Figure 4:
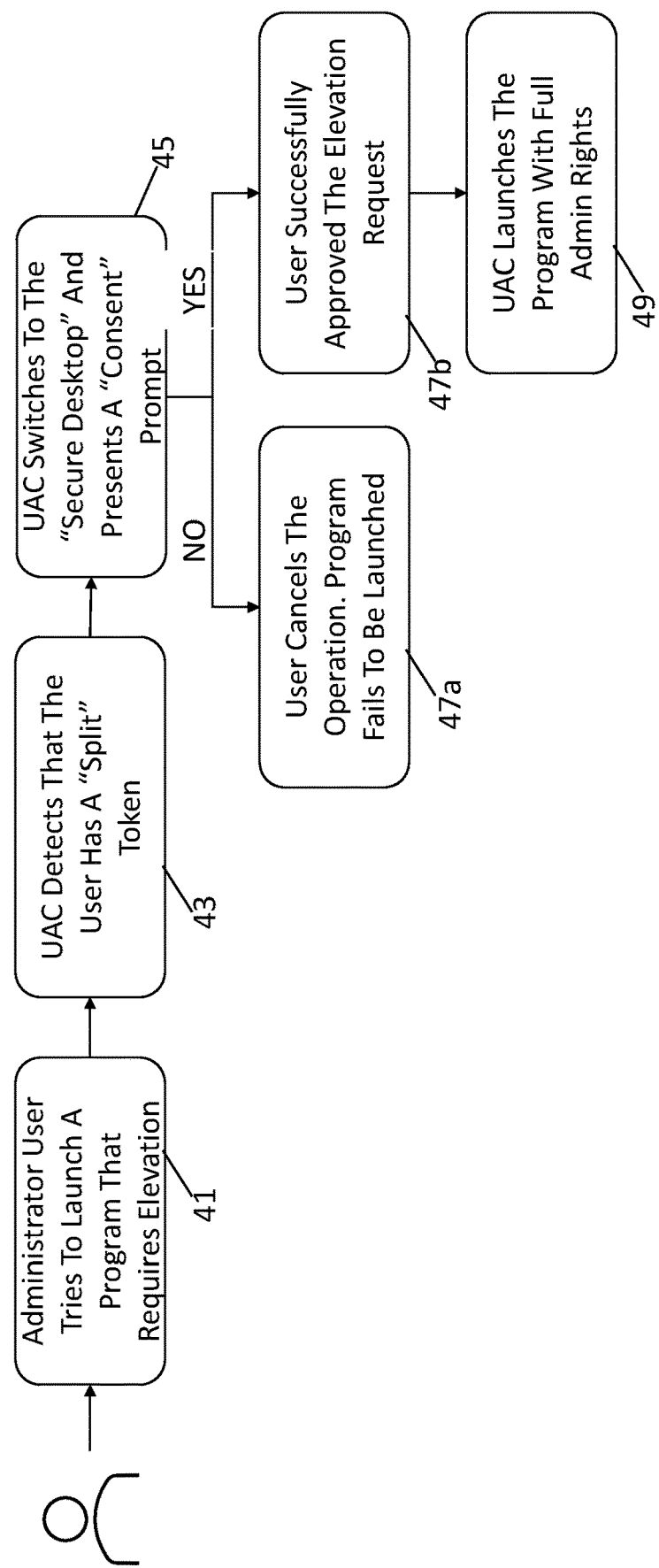
FIG. 4 is a flow diagram showing an admin user running a program with elevation, using the Windows® UAC, as in the prior art.

As shown in FIG. 5, after a logon by a regular user (FIG. 1) or an admin user (FIG. 2), the user tries to launch 51 a program that always requires elevation or selectively requires elevation (FIG. 3 or FIG. 4) implementing a privilege management agent in an operating system having pre-defined application control policies, an Application Control Service (ACS) and User Account Control (UAC) used to process elevation requests to provide a token to allow a process running under a user account to run as an elevated process based on the pre-defined application control policies. A UAC consent prompt (53) is intercepted, and the program is allowed to run without elevation, but is tagged for possible subsequent elevation via ACS.

The PrivMan ACS evaluates 55 the tagged process and pre-defined application control policies for a match which corresponds to the elevation request. If no matching access policy is found, the process is terminated and relaunched 57*a* for running as a process with the primary access token without elevation and Microsoft®'s default UAC implementation handles the elevation request as in the prior art.

If a matching application control policy is found, the ACS applies 57*b* a customized access token to the primary access token to elevate the process to run with elevated rights as defined by the customized access token.

Figure 6:
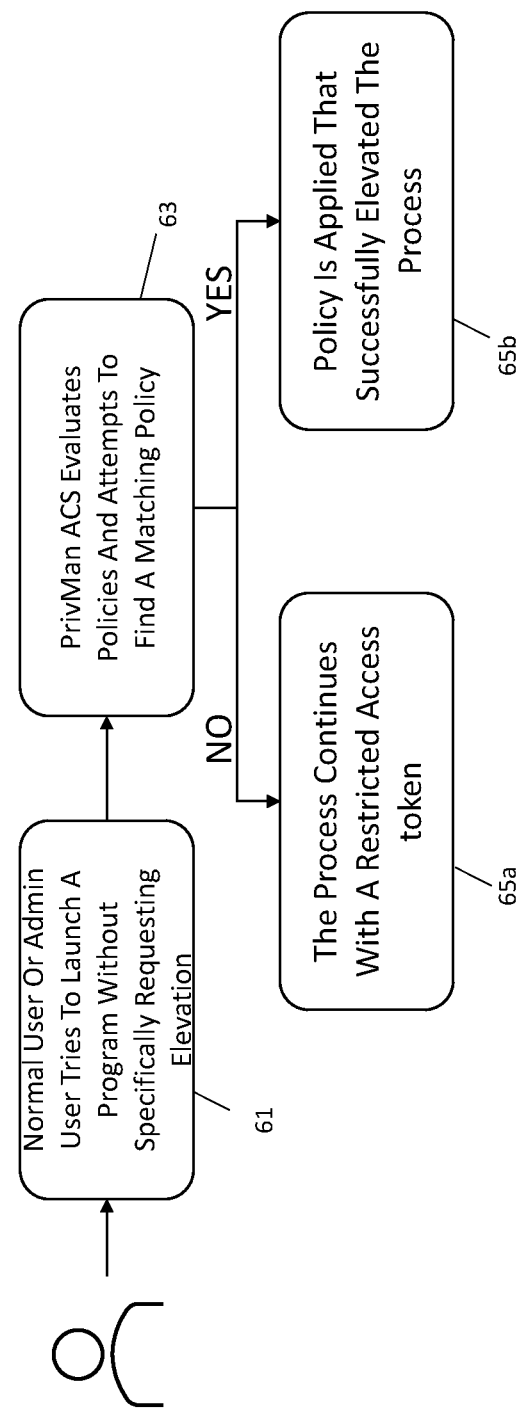
FIG. 6 is a flow diagram showing a normal or admin user running a program with or without elevation, according to the invention.

FIG. 6 is a flow diagram showing a normal or admin user running a program with or without elevation, according to the invention where the PrivMan ACS and User Account Control (UAC) are used to process elevation requests to provide a token to allow a process running under a user account to run as an elevated process based on pre-defined application control policies.

After a process having a primary access token is launched 61 without an elevation request, the PrivMan ACS evaluates 63 the process and pre-defined application control policies for a match which would allow the process to run with elevation.

If the PrivMan ACS does not find a matching policy, the process continues to run 65*a* with the restricted access token. If the PrivMan ACS finds a matching policy, it is applied 65*b* to the process to allow the process to run with elevated rights.

FIG. 6 is similar to FIG. 5 except that in the case of FIG. 6, the user makes no explicit request for elevation, and elevation is applied or not applied based on policies in place for that user. If no application control policies are configured to explicitly provide elevation, the target process continues to execute using the primary access token that it inherited from the parent process that created it.

Figure 7:
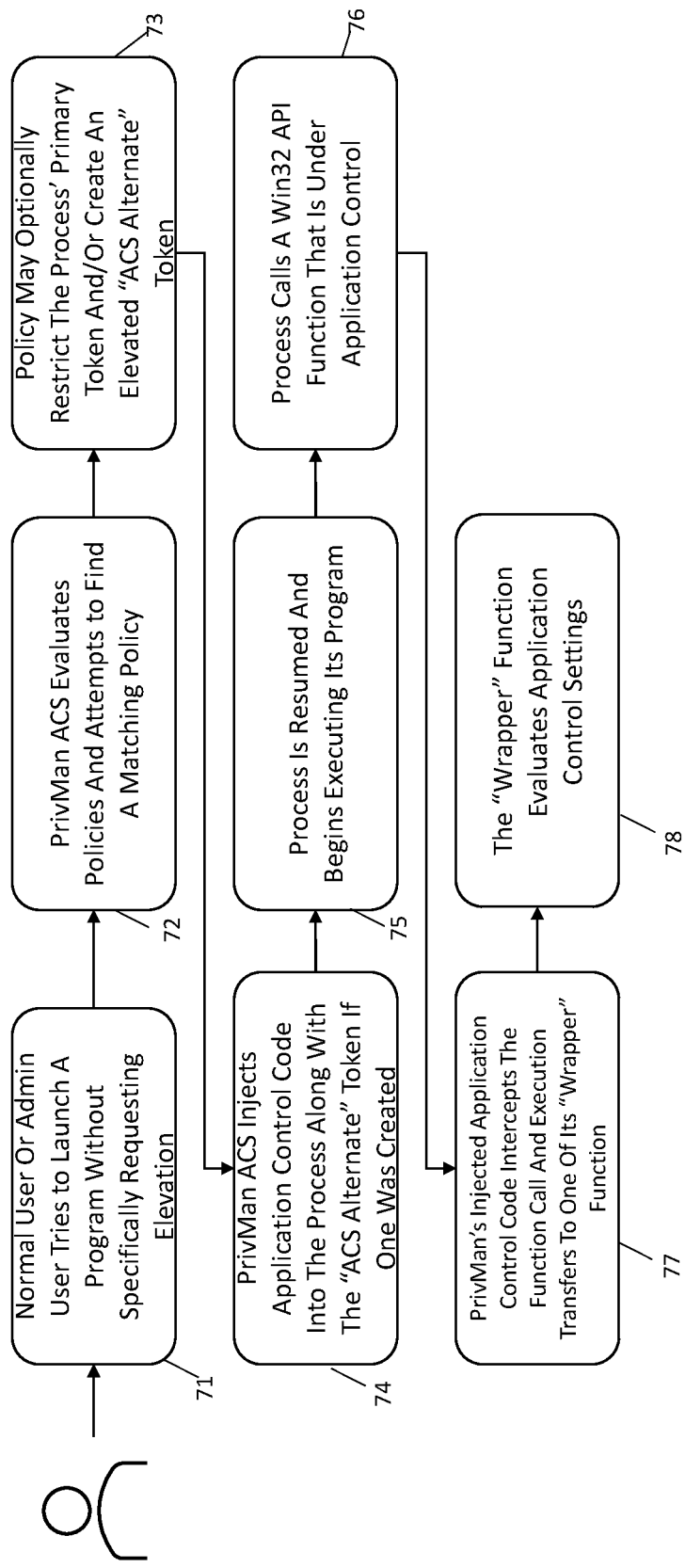
FIG. 7 is a flow diagram showing a normal or admin user running a program with or without elevation, with a Win 32 API function control use scenario, with a block call, according to the invention.

FIG. 7 is a flow diagram showing a normal or admin user running a program with or without elevation, with a Win 32 API function control use scenario, with a block call, according to the invention. In this connection, a block call means the function call is blocked from passing through to Microsoft®'s implementation.

After a program is launched 71 without an elevation request, the PrivMan ACS evaluates 72 the process and pre-defined application control policies for a match which would allow the process to run with elevation.

In this scenario, the policy may optionally restrict the primary access token of the process and/or create an elevated ACS Alternate token 73. The PrivMan ACS then injects 74 application control code into the process along with the elevated ACS Alternate token if one was created. The determination as to whether the elevated ACS Alternate access is created is based on the application control policy that was applied to the process.

The process is then resumed and begins executing 75 its program. The process then calls 76 a Win32 API function that is under application control. The PrivMan injected application control code intercepts the API function call and transfers 77 execution to its wrapper function. The wrapper function evaluates 78 the settings provided by the application control policy, and assuming the settings do not permit the function call to execute, the function call is blocked from passing through to Microsoft®'s implementation and returns an access denied error. Otherwise, the function call is permitted to execute as explained with reference to FIG. 8.

Figure 8:
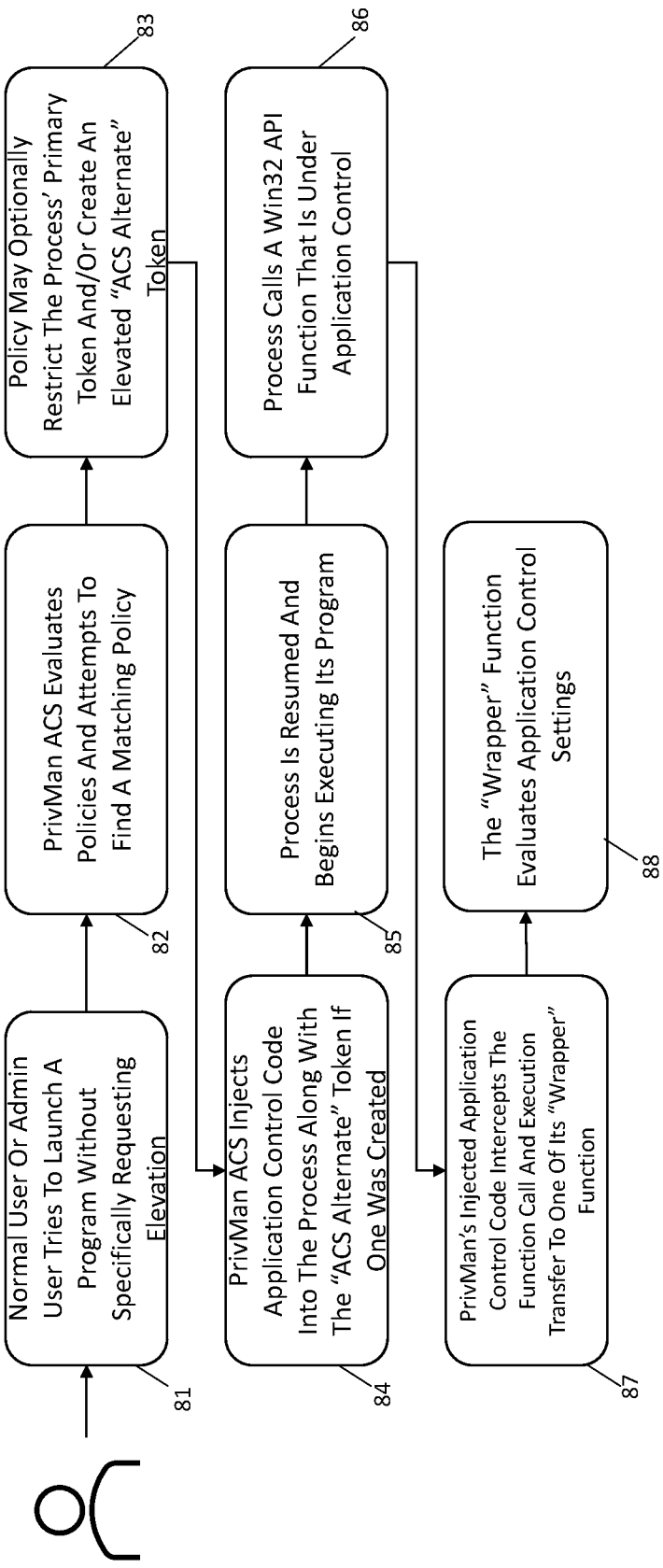
FIG. 8 is a flow diagram showing a normal or admin user running a program with or without elevation, with a Win 32 API function control use scenario, with an allow call, according to the invention.

FIG. 8 is a flow diagram showing a normal or admin user running a program with or without elevation, with a Win 32 API function control use scenario, with an allow call, according to the invention. In this connection, an allow call means, the function is passed through to Microsoft®'s implementation for handling In FIG. 8, blocks 81-87 operate in the same manner as blocks 71-77 in FIG. 7. However, in this case, the wrapper function evaluates 88 the settings provided by the application control policy and determines that the settings do permit the function call to execute. In this case, the function is passed through to Microsoft®'s implementation for handling with the function parameters optionally being modified based on the application control policy that was applied to the process.

Figure 9:
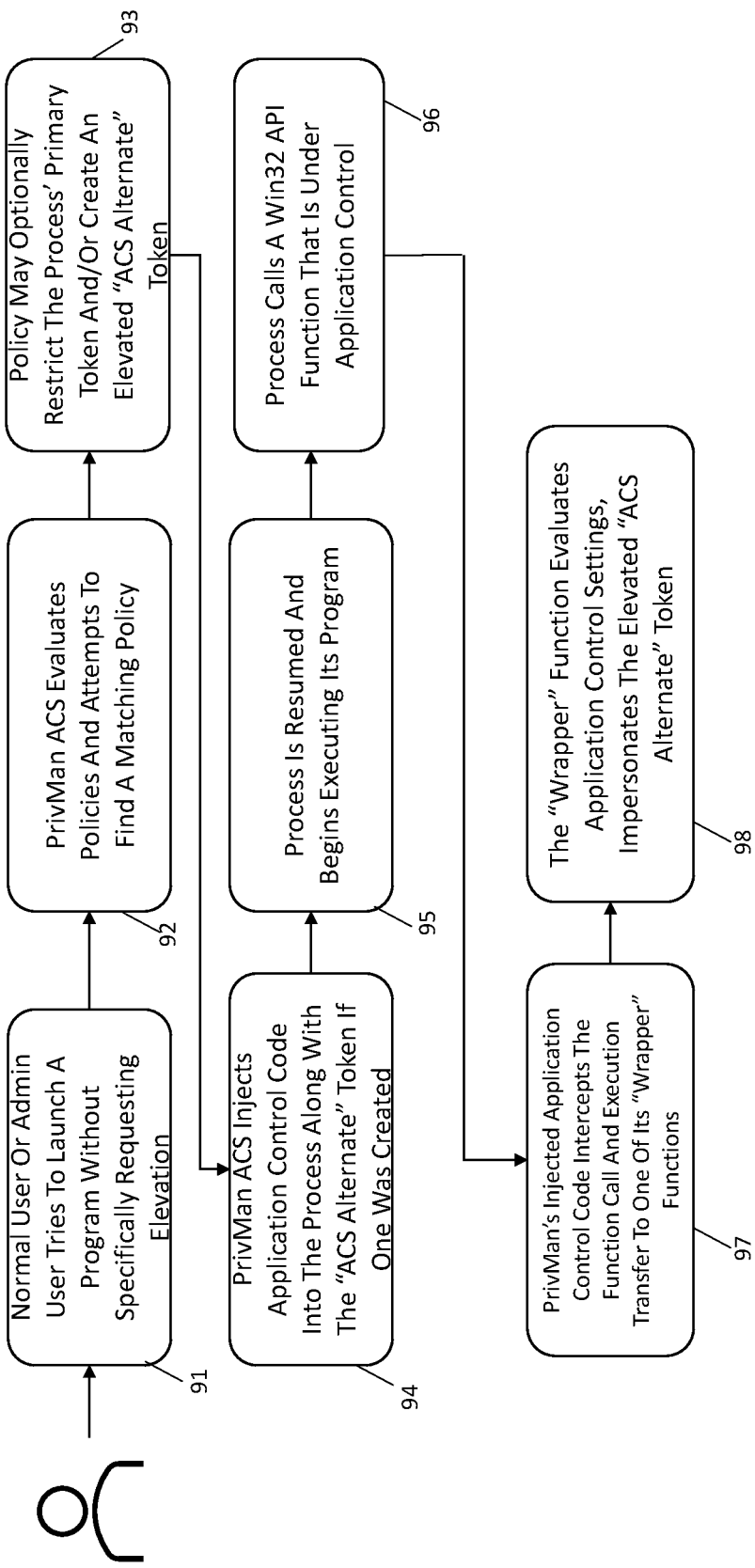
FIG. 9 is a flow diagram showing a normal or admin user running a program with or without elevation, with a Win 32 API function control use scenario, with an allow call with elevation, according to the invention.

FIG. 9 is a flow diagram showing a normal or admin user running a program with or without elevation, with a Win 32 API function control use scenario, with an allow call with elevation, according to the invention.

In FIG. 9, blocks 91-97 operate in the same manner as blocks as blocks 81-87 in FIG. 8 and blocks 71-77 in FIG. 7. However, in this case, the wrapper function evaluates 98 the settings provided by the application control policy, saves the current thread impersonation state, impersonates the elevated ACS Alternate token, and determines that the settings do permit the function call to execute. In this case, the function is passed through to Microsoft®'s implementation for handling with the function parameters optionally being modified based on the application control policy that was applied to the process. The thread's prior impersonation state is then restored before control is returned to the program's code.

Figure 10:
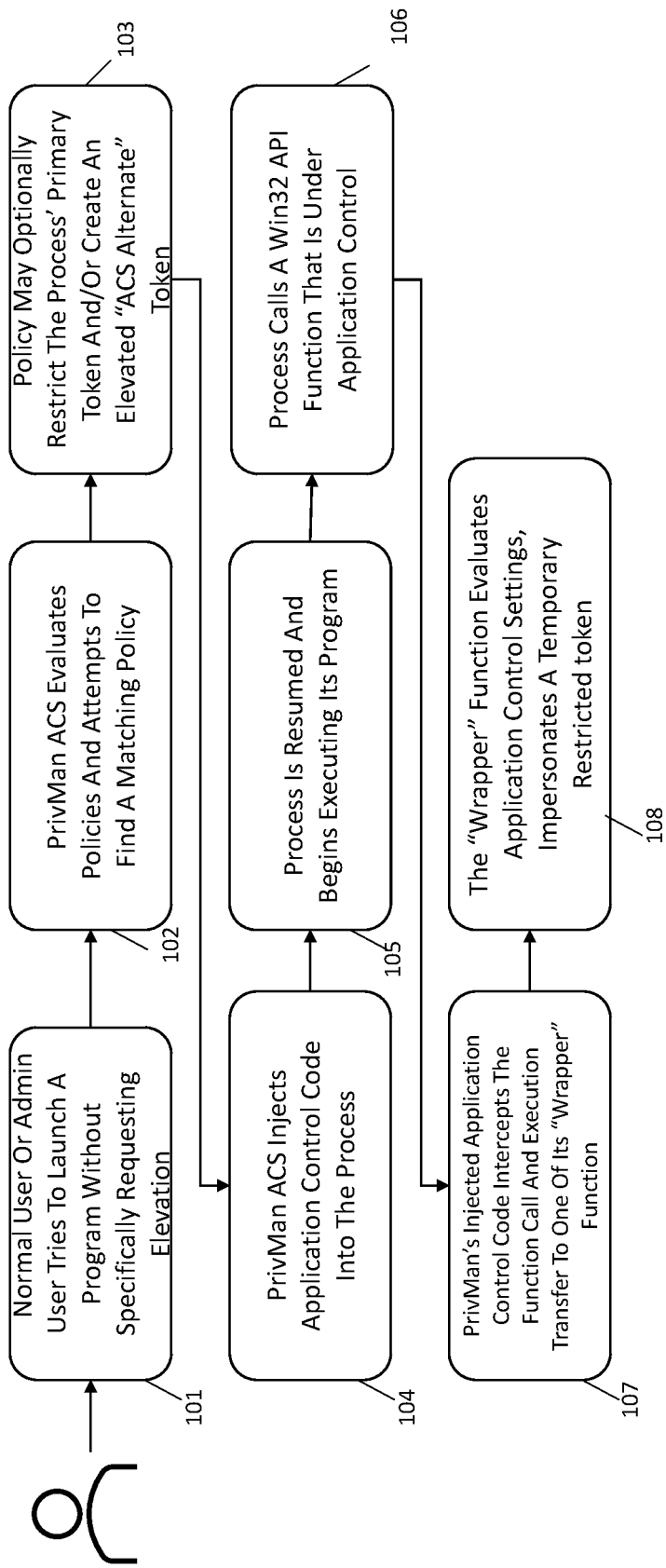
FIG. 10 is a flow diagram showing a normal or admin user running a program with or without elevation, with a Win 32 API function control use scenario, with an allow call with restriction, according to the invention.

FIG. 10 is a flow diagram showing a normal or admin user running a program with or without elevation, with a Win 32 API function control use scenario, with an allow call with restriction, according to the invention.

In FIG. 10, blocks 101-107 operate in the same manner as blocks as blocks 91-97 in FIG. 9, blocks 81-87 in FIG. 8 and blocks 71-77 in FIG. 7. However, in this case, the wrapper function evaluates 108 the settings provided by the application control policy, saves the current thread impersonation state, impersonates a temporary ACS Restricted token, and the function call is passed through to Microsoft®'s implementation for handling with the function parameters optionally being modified based on the application control policy that was applied to the process. The thread's prior impersonation state is then restored before control is returned to the program's code.

The descriptions and figures presented herein, although specific to the Microsoft® Windows environment, are not inherently related to any specific computer or other apparatus. Various general-purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while embodiments have described herein to illustrate the range of possible implementations, those skilled in the art would understand that any combination of these techniques can be utilized, such that the invention would not have an entirely hardware or software implementation, for example, the invention described herein could be implemented in microcoded hardware components.

In view of the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:

1. A method for implementing a privilege management agent in an operating system having User Account Control (UAC), the privilege management agent having pre-defined application control policies and an application control service (ACS), the privilege management agent used to process elevation requests to provide a token to allow a process running under a user account to run as an elevated process based on a pre-defined process access policies, the method comprising:

after a process having a primary access token is launched without an elevation request, said ACS evaluating said process and said pre-defined process access policies for a match which would allow said process to run as a process with elevation, if said ACS does not find a matching policy, allowing said process to run with a restricted access token;

if said ACS finds a matching policy, applying said matching policy to said process to allow said process to run with elevated rights, wherein one of said pre-defined access policies selectively restricts said primary access token and/or creates an alternate access token for use by an injected application control code, said method further comprising:

temporarily halting said process, said ACS injecting said application control code into said process;

if said alternate access token was created, injecting said alternate access token into said process;

resuming said process;

if said process calls an API function that is under application control, said injected application control intercepting said API function call and transferring execution of said process to a wrapper function;

said wrapper function evaluating settings provided by said application control;

said wrapper function returning an access denied error if said settings do not allow the function call to proceed;

said wrapper function allowing the function call to proceed, if said settings allow the function call.

2. The method defined by claim 1, wherein if said wrapper function allows the function call to proceed, said wrapper function saves a current thread impersonation state, impersonates the alternate access token, and restores a prior impersonation state of the current thread before control is returned to the process.

3. The method defined by claim 1, wherein if said wrapper function allows the function call to proceed, said wrapper function saves a current thread impersonation state, impersonates the restricted access token, and restores a prior impersonation state of the current thread before control is returned to the process.

4. The method defined by claim 1, wherein said privilege management agent modifies how said UAC handles the elevation requests by selectively removing a linked admin token from said primary access token, creating said alternate access token and setting the alternate access token as a new primary access token for the process.

5. The method defined by claim 1, wherein said ACS creates an elevated token based on policy settings by injecting said application control code into said process to ensure that the process has application control asserted over it and by making the injected application control code aware of the presence of the elevated token.

6. The method defined by claim 1, wherein said wrapper function obtains existing application control settings data and selectively:

a) blocks the function call either unconditionally or selectively based on said existing application control settings data;

b) allows the function call to proceed unmodified either unconditionally or selectively based on said existing application control settings data;

c) allows the function call to proceed with one or more input parameters modified to change the way that the underlying function call operates;

d) allows the function call to proceed while temporarily impersonating said alternate access token;

e) allows the function call to proceed, and if the primary access token is elevated, generates the restricted access token from the primary access token that will be impersonated for the duration of the function call.

7. The method defined by claim 4, wherein said privilege management agent prevents said process from creating a child process that runs elevated by way of a UAC "Consent" prompt for "Admin Approval Mode" elevation requests.

8. The method defined by claim 7, wherein said alternate access token exists only for use by said privilege management agent.

9. The method defined by claim 1, wherein the injected application control code hooks Win32 API functions based on policy settings that the ACS injected into the process as an application control setting.

10. The method defined by claim 9, wherein the process makes a call to one of said hooked Win32 API functions and execution is routed through a corresponding wrapper function.

* * * * *